United States Patent
Zhao

(10) Patent No.: US 8,274,253 B2
(45) Date of Patent: Sep. 25, 2012

(54) CONTROL CIRCUIT FOR SINGLE-PHASE AC MOTOR FOR DRYER

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/206,502

(22) Filed: Aug. 9, 2011

(65) Prior Publication Data

US 2011/0298413 A1 Dec. 8, 2011

Related U.S. Application Data

(63) Continuation of application No. PCT/CN2010/070392, filed on Jan. 28, 2010.

(30) Foreign Application Priority Data

May 11, 2009 (CN) .......................... 2009 2 0056315

(51) Int. Cl.
*H02P 1/44* (2006.01)

(52) U.S. Cl. ........ 318/786; 318/785; 318/781; 318/778; 318/767; 318/727

(58) Field of Classification Search ................... 318/786, 318/785, 781, 778, 767, 727
See application file for complete search history.

(56) References Cited

U.S. PATENT DOCUMENTS 3,854,164 A * 12/1974 Schmitz ..................... 15/340.2

* cited by examiner

*Primary Examiner* — Walter Benson
*Assistant Examiner* — David Luo
(74) *Attorney, Agent, or Firm* — Matthias Scholl P.C.; Matthias Scholl

(57) ABSTRACT

A single-phase AC motor control circuit for a dryer, including a starting control unit, a first drive circuit, a bidirectional triode thyristor BCR1, a second drive circuit, and a bidirectional triode thyristor BCR2. The bidirectional triode thyristor BCR1 is serially connected to a motor starting winding, and a starting capacitor, and then to a utility power AC input. The starting control unit is connected to a control end of the bidirectional triode thyristor BCR1 via the first drive circuit. The bidirectional triode thyristor BCR2 is serially connected to an electrically heated strip, and then to the utility power AC input. The starting control unit is connected to a control end of the bidirectional triode thyristor BCR2 via the second drive circuit. The first drive circuit is interlocked with the second drive circuit.

4 Claims, 3 Drawing Sheets

CONTROL CIRCUIT FOR SINGLE-PHASE AC MOTOR FOR DRYER

CROSS-REFERENCE TO RELATED APPLICATIONS

This application is a continuation of International Patent Application No. PCT/CN2010/070392 with an international filing date of Jan. 28, 2010, designating the United States, now pending, and further claims priority benefits to Chinese Patent Application No. 200920056315.2 filed on May 11, 2009. The contents of all of the aforementioned applications, including any intervening amendments thereto, are incorporated herein by reference.

BACKGROUND OF THE INVENTION

1. Field of the Invention

The invention relates to a motor control circuit, and more particularly to a single-phase AC motor control circuit for a dryer.

2. Description of the Related Art

Nowadays, most motors for dryers employ mechanical centrifugal switches with contacts for starting or for switching control. The mechanical centrifugal switch is connected to a starting winding of a dryer. As the motor of the dryer is started, and rotation speed thereof is 70%-85% of synchronous speed, the mechanical centrifugal switch is switched on under the action of centrifugal force, switches off the starting circuit and operates. During on/off of the mechanical centrifugal switch, arc spark is generated, which affects work life thereof. In addition, the mechanical centrifugal switch must be disposed in the motor of the dryer, which features complex structure, makes it inconvenient to design overall structure of the motor, and increases size of the motor, and material cost of the motor. It is well-known that during a starting phase, the starting winding and the main winding require comparatively large current, if the starting windings, the main windings, and the heated strips of multiple dryers are simultaneously powered up during the starting phase, starting of the motor is to be affected, and a comparatively large workload is formed, which brings about certain impact on a power system, increases starting time, or even makes it impossible for normal starting, and features imperfect control.

SUMMARY OF THE INVENTION

In view of the above-described problem, it is an objective of the invention to provide a single-phase AC motor control circuit for a dryer that is capable of addressing the above-mentioned problems.

To achieve the above objectives, in accordance with one embodiment of the invention, provided is a single-phase AC motor control circuit for a dryer, comprising a starting control unit, a first drive circuit, a bidirectional triode thyristor BCR1, a second drive circuit, and a bidirectional triode thyristor BCR2, the bidirectional triode thyristor BCR1 is serially connected to a motor starting winding, and a starting capacitor, and then to a utility power AC input, the starting control unit is connected to a control end of the bidirectional triode thyristor BCR1 via the first drive circuit, the bidirectional triode thyristor BCR2 is serially connected to an electrically heated strip, and then to the utility power AC input, the starting control unit is connected to a control end of the bidirectional triode thyristor BCR2 via the second drive circuit, and the first drive circuit is interlocked with the second drive circuit, so that as the bidirectional triode thyristor BCR1 is on, the bidirectional triode thyristor BCR2 is off, and as the bidirectional triode thyristor BCR1 is off, the bidirectional triode thyristor BCR2 is on.

In a class of this embodiment, the starting control unit comprises a rectifying and voltage-stabilizing circuit, a detecting circuit, and a voltage comparison circuit, an input end of the rectifying and voltage-stabilizing circuit is connected to the utility power AC input, an output end of the rectifying and voltage-stabilizing circuit provides low-voltage DC power supply for the detecting circuit and the voltage comparison circuit, the detecting circuit detects an electric signal of the motor main winding, and inputs the electric signal to the voltage comparison circuit for processing, and an output end of the voltage comparison circuit is connected to an input end of each of the first drive circuit and the second drive circuit.

In a class of this embodiment, the voltage comparison circuit employs a hysteresis comparison circuit.

In a class of this embodiment, the first drive circuit and the second drive circuit are photoelectric coupling circuits.

Advantages of the invention over the prior art comprise: 1) it has an independent drive circuit for the electrically heated strip, a drive circuit for the motor starting winding and that for the electrically heated strip are interlocked with each other, as the heater strip is powered on, the starting winding is powered off, as the starting winding is powered on, the heater strip is powered off, the invention features perfect control and convenient use, and ensures normal operation of the motor of the dryer; 2) the invention can be installed on outer surface of the motor of the dryer, which simplifies overall design and assembly of thereof, reduces size thereof, and saves raw materials; 3) the bidirectional triode thyristor is used for replacing a conventional mechanical centrifugal switch, and no arc spark is generated during on/off thereof, which is safe and reliable, and thus the invention has long work life; 4) the hysteresis comparison circuit is capable of switching off an operating loop of the motor of the dryer as being higher than a current value of the main winding, and switching on the operating loop thereof as being lower than another current value of the main winding, which makes control comparatively accurate and perfect, and improves operating efficiency of the motor of the dryer.

DETAILED DESCRIPTION OF THE EMBODIMENTS

Further description of the invention will be given below in conjunction with specific embodiments and accompanying drawings.

Figure 1:
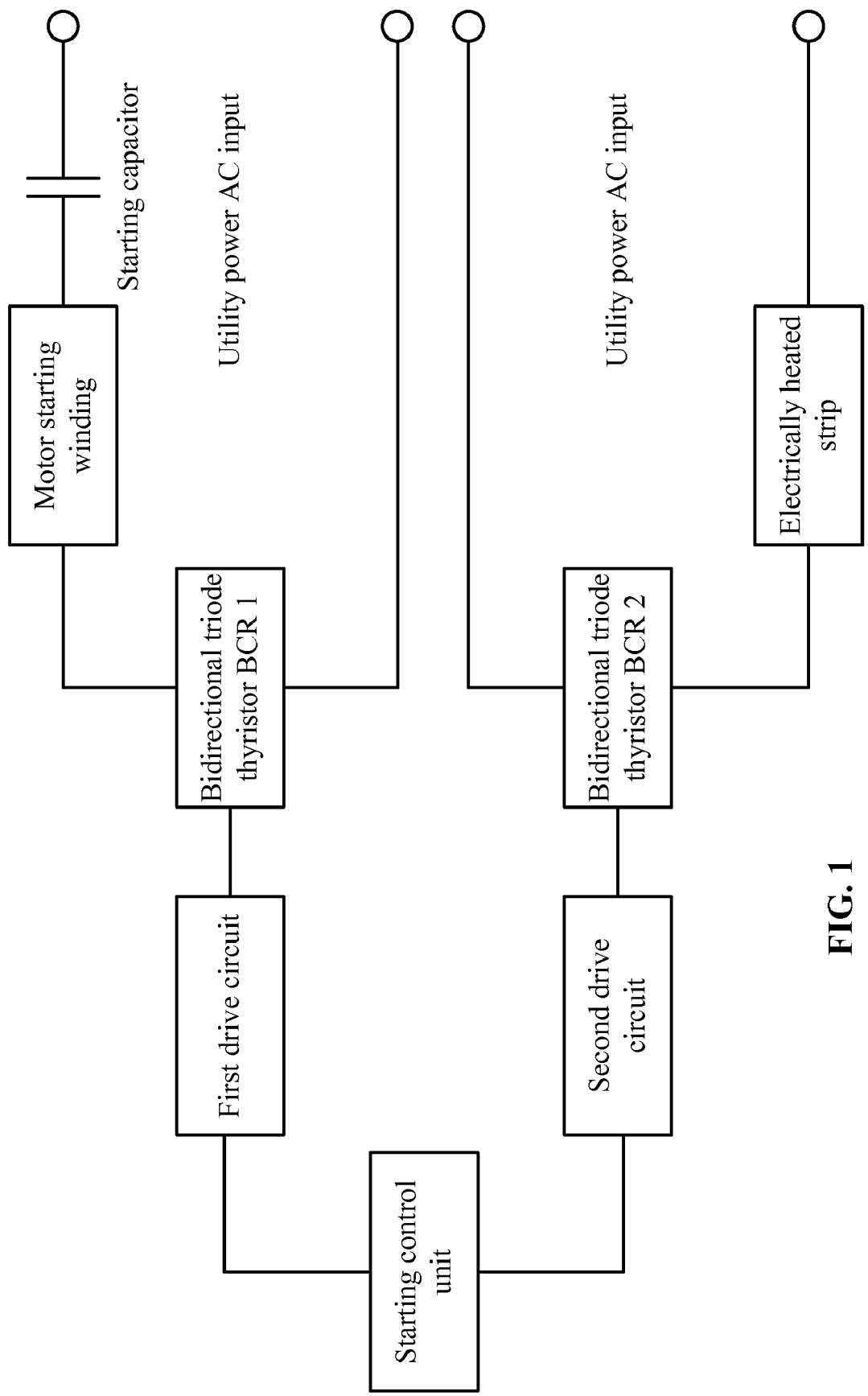
FIG. 1 is a block diagram of a single-phase AC motor control circuit for a dryer of an exemplary embodiment of the invention.
Figure 2:
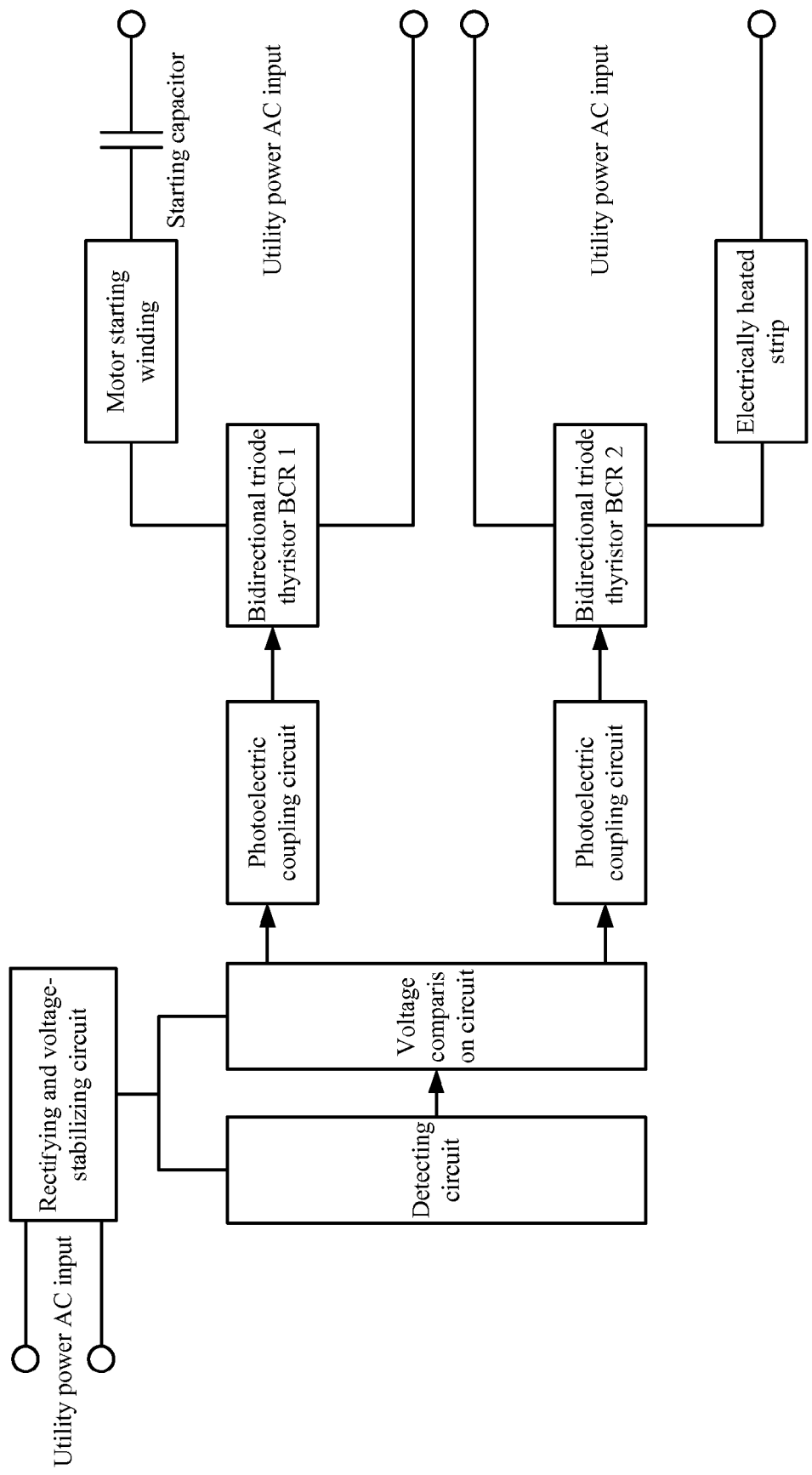
FIG. 2 is a detailed block diagram of FIG. 1.

As shown in FIGS. 1 and 2, a single-phase AC motor control circuit for a dryer comprises a starting control unit, a first drive circuit, a bidirectional triode thyristor BCR1, a second drive circuit, and a bidirectional triode thyristor BCR2.

The bidirectional triode thyristor BCR1 is serially connected to a motor starting winding, and a starting capacitor, and then to a utility power AC input.

The starting control unit is connected to a control end of the bidirectional triode thyristor BCR1 via the first drive circuit.

The bidirectional triode thyristor BCR2 is serially connected to an electrically heated strip, and then to the utility power AC input.

The starting control unit is connected to a control end of the bidirectional triode thyristor BCR2 via the second drive circuit.

The first drive circuit is interlocked with the second drive circuit, so that as the bidirectional triode thyristor BCR1 is on, the bidirectional triode thyristor BCR2 is off, and as the bidirectional triode thyristor BCR1 is off, the bidirectional triode thyristor BCR2 is on.

The starting control unit comprises a rectifying and voltage-stabilizing circuit, a detecting circuit, and a voltage comparison circuit, an input end of the rectifying and voltage-stabilizing circuit is connected to the utility power AC input, an output end of the rectifying and voltage-stabilizing circuit provides low-voltage DC power supply for the detecting circuit and the voltage comparison circuit, the detecting circuit detects an electric signal of the motor main winding, and inputs the electric signal to the voltage comparison circuit for processing, and an output end of the voltage comparison circuit is connected to an input end of each of the first drive circuit and the second drive circuit.

Figure 3:
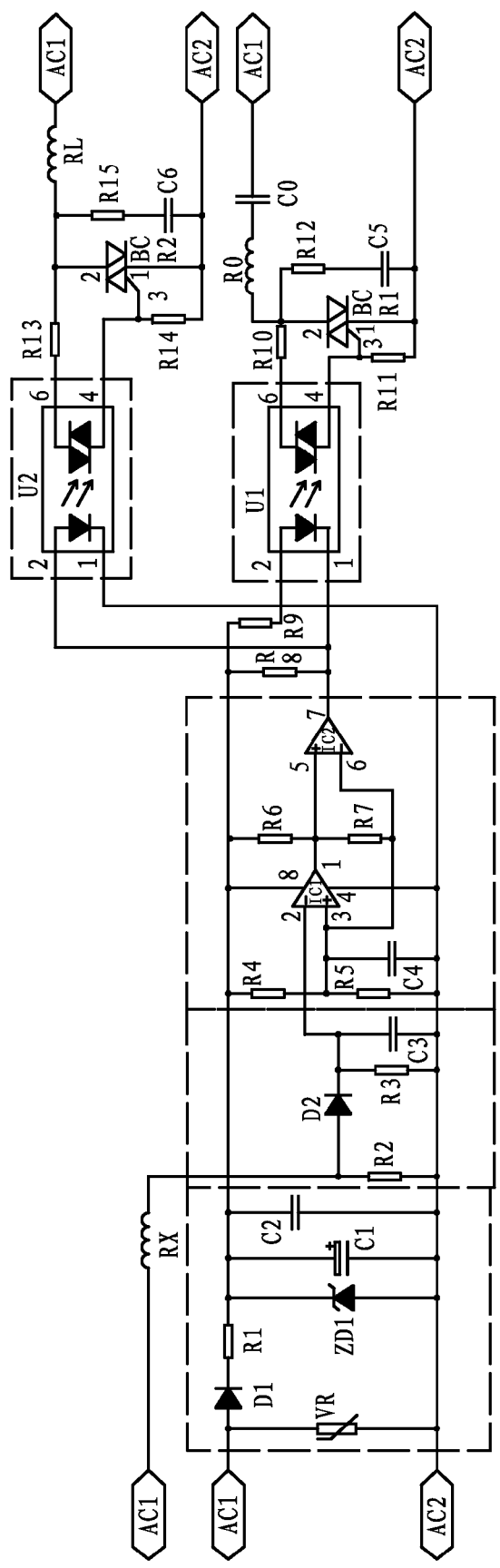
FIG. 3 is a circuit diagram of a single-phase AC motor control circuit for a dryer of an exemplary of the invention.

As shown in FIG. 3, the rectifying and voltage-stabilizing circuit comprises a diode D1, a resistor R1, a fuse VR, a stabilivolt tube ZD1, and capacitors C1 and C2. The detecting circuit comprises resistors R2 and R3, diode D2, and a capacitor C3, and operates to detect an electric signal of the motor main winding RX. The electric signal is rectified via the diode D2, and then output via the capacitor C3. The voltage comparison circuit is a hysteresis comparison circuit, and comprises a pre-comparator IC1, resistors R4-R7, a capacitor C4, and a post-comparator IC2.

The first drive circuit comprises a photoelectric coupler U1, and resistors R10 and R11. A resistor R8 is serially connected between an output end of the post-comparator IC2 and that of the rectifying and voltage-stabilizing circuit, a pin 1 of the photoelectric coupler U1 is connected to the output end of the post-comparator IC2, and a pin 2 of the photoelectric coupler U1 is connected to the output end of the rectifying and voltage-stabilizing circuit. The second drive circuit comprises a photoelectric coupler U2, and resistors R13 and R14, a pin 1 of the photoelectric coupler U2 is connected to the ground, and a pin 2 thereof is connected to an output end of the post-comparator IC2.

Operation principle of the invention is: as power is on, the motor main winding is energized and operates, the detecting circuit detects a current signal of the motor main winding RX is high enough, and inputs the signal to the input end of the hysteresis comparison circuit, the output end of the hysteresis comparison circuit outputs low level. Namely, as input of the pin 1 of the photoelectric coupler U1 is low level, input of the pin 2 of the photoelectric coupler U2 is low level, the photoelectric coupler U1 is on, the photoelectric coupler U2 is off, the photoelectric coupler U1 triggers and controls the bidirectional triode thyristor BCR1 to be connected to the starting winding R0, and the starting capacitor C0. At this time, the drive circuit for the electrically heated strip does not operate, and the motor starting winding starts the motor for operation. As rotating speed of the motor is 70-85% of synchronous speed, the detecting circuits detects that a current signal of the motor main winding RX is comparatively low, the output end of the hysteresis comparison circuit outputs high level, namely the input of the pin 1 of the photoelectric coupler U1 is high level, and the input of the photoelectric coupler U2 is also high level. The photoelectric coupler U1 is off, the photoelectric coupler U2 is on, the photoelectric coupler U2 triggers and controls the bidirectional triode thyristor BCR2 to be connected to the electrically heated strip RL. At this time, the drive circuit for the motor starting winding stops operation, and the drive circuit for the electrically heated strip controls the motor to operate. Reference and comparison voltage of the hysteresis comparison circuit is used to implement automatic adjustment. As rotating speed of the motor is reduced to a certain value, for example, 40% of the synchronous speed, the detecting circuit detects the current signal of the motor main winding RX is high enough, the output end of the hysteresis comparison circuit is low level, namely as the input of the pin 1 of the photoelectric coupler U1 is low level, the input of the pin 2 of the photoelectric coupler U2 is also low level. The photoelectric coupler U1 is on, the photoelectric coupler U2 is off, and the photoelectric coupler U1 again triggers and controls the bidirectional triode thyristor BCR1 to be connected to the starting winding R0, and the starting capacitor C0. At this time, the drive circuit of the electrically heated strip stops operation, the motor starting winding restarts the motor, and thus a circulation process is formed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A control circuit for a single-phase AC motor of a dryer, comprising a starting control unit;
    a first drive circuit;
    a bidirectional triode thyristor BCR1;
    a second drive circuit; and
    a bidirectional triode thyristor BCR2;
wherein
    said bidirectional triode thyristor BCR1 is serially connected to a motor starting winding, and a starting capacitor, and then to a utility power AC input;
    said starting control unit is connected to a control end of said bidirectional triode thyristor BCR1 via said first drive circuit;
    said bidirectional triode thyristor BCR2 is serially connected to an electrically heated strip, and then to said utility power AC input;
    said starting control unit is connected to a control end of said bidirectional triode thyristor BCR2 via said second drive circuit; and
    said first drive circuit is interlocked with said second drive circuit, so that as said bidirectional triode thyristor BCR1 is on, said bidirectional triode thyristor BCR2 is off, and as said bidirectional triode thyristor BCR1 is off, said bidirectional triode thyristor BCR2 is on.

2. The circuit of claim 1, wherein
    said starting control unit comprises a rectifying and voltage-stabilizing circuit, a detecting circuit, and a voltage comparison circuit;
    an input end of said rectifying and voltage-stabilizing circuit is connected to said utility power AC input;
    an output end of said rectifying and voltage-stabilizing circuit provides low-voltage DC power supply for said detecting circuit and said voltage comparison circuit;
    said detecting circuit detects an electric signal of said motor main winding, and inputs said electric signal to said voltage comparison circuit for processing; and an output end of said voltage comparison circuit is connected to an input end of each of said first drive circuit and said second drive circuit.

3. The circuit of claim 2, wherein said voltage comparison circuit is a hysteresis comparison circuit.

4. The circuit of claim 1, wherein said first drive circuit and said second drive circuit are photoelectric coupling circuits.

* * * * *